United States Patent [19]
Sato et al.

[11] Patent Number: 5,083,824
[45] Date of Patent: Jan. 28, 1992

[54] GRIPPING HEAD OF APPARATUS FOR HANDLING OBJECTS SUCH AS LIPSTICKS AND THE LIKE

[75] Inventors: Naomi Sato; Isao Watanabe, both of Tokyo, Japan

[73] Assignee: Bridgestone Corporation, Tokyo, Japan

[21] Appl. No.: 655,263

[22] Filed: Feb. 13, 1991

Related U.S. Application Data

[63] Continuation of Ser. No. 416,329, Sep. 29, 1989, abandoned.

[30] Foreign Application Priority Data

Oct. 11, 1988 [JP] Japan ................. 63-255390

[51] Int. Cl.$^5$ ..................... B25J 15/00; B66C 1/46
[52] U.S. Cl. ................. 294/119.3; 294/87.1
[58] Field of Search ............. 294/63.2, 87.1, 90, 294/98.1, 99.1, 119.3; 269/22; 279/2 A, 4; 285/97; 403/5

[56] References Cited

U.S. PATENT DOCUMENTS

| | | | |
|---|---|---|---|
| 2,308,209 | 1/1943 | Schmutzer et al. | 294/119.3 |
| 2,695,190 | 11/1954 | Meierjohan | 294/119.3 |
| 2,873,996 | 2/1959 | McHugh | 294/90 |
| 3,071,403 | 1/1963 | Preu et al. | 294/119.3 |
| 3,171,681 | 3/1965 | Roller | 294/119.3 |
| 3,831,995 | 8/1974 | Duncan | 294/119.3 |
| 4,472,934 | 9/1984 | Kriechbaum et al. | 294/119.3 X |
| 4,486,045 | 12/1984 | Trygg | 294/119.3 X |
| 4,783,108 | 11/1988 | Fukuyama et al. | 294/98.1 |

FOREIGN PATENT DOCUMENTS

| | | | |
|---|---|---|---|
| 2458567 | 7/1975 | Fed. Rep. of Germany | 294/119.3 |
| 2240103 | 3/1978 | Fed. Rep. of Germany | 294/119.3 |

Primary Examiner—Johnny D. Cherry
Attorney, Agent, or Firm—Jordan and Hamburg

[57] ABSTRACT

A gripping head of a handling apparatus grips objects, such as lipsticks or the like by means of the inflated surface of the tube thereof. A fluid inlet is formed on top of the hard body, and a fluid path is formed in the hard body. The outer cylinder open at the lower end thereof is so fixed on the hard body as to contain the latter, and the above-mentioned tube open at both ends thereof is fixed at both the ends to the lower outside end of the outer cylinder and the hard body or to the upper and lower outer ends of the hard body. The object is caught by the catching head when the tube is inflated inwardly as the fluid such as air is supplied into the space between the tube and outer cylinder or into the inside space of the tube through the fluid path from the fluid inlet.

1 Claim, 10 Drawing Sheets

GRIPPING HEAD OF APPARATUS FOR HANDLING OBJECTS SUCH AS LIPSTICKS AND THE LIKE

This application is a continuation, of application Ser. No. 07/416,329, filed Sept. 29, 1989, now abandoned.

BACKGROUND OF THE INVENTION

The present invention relates to a gripping head of a handling apparatus, of which the inflated tubular surface is to grip objects such as lipsticks and the like.

FIGS. 1 and 2 show a typical conventional gripping head. As seen, gripping head comprises a hard cylindrical body 100 open at both ends thereof, a tube 101 covering the inner wall of the body 100 and open at both ends thereof, and a fluid path 102 formed in the hard body 100. When a fluid such as air is supplied from the fluid path 102, the tube 101 is inflated inwardly and the inflated surface of the tube 101 grips on object. Both ends of the tube 101 are folded back from inside to outside of the hard body 100 and secured to the hard body 100 with calking rings 103 and 104. The hard body 100 has an outwardly protruding flange-shaped portion 100A. The fluid path 102 is formed in this flange portion 100A, and also taps 105 are formed on the flange portion 100A for installing the gripping head in the handling apparatus. The flange portion 100A has to protrude at least 10 mm from the hard body 100. The gripping head of the above-mentioned structure is moved up and down after being installed in the handling apparatus by means of the taps 105.

However, an attempt to grip a plurality of objects 200 such as lipsticks as shown in FIG. 18 all at once with the gripping heads shown in FIGS. 1 and 2 disposed side by side in a line will be unsuccessful unless the lipsticks are placed with sufficiently wide spacings for the gripping heads to exactly face the correesponding lipsticks without interfering with each other. The outside diameter R of the individual gripping heads is so large that when a plurality of the gripping heads is placed correspondly to a plurality of the lipsticks disposed with narrow spacings, in a line, they will theoretically overlap each other as shown by hatching in FIG. 3. Also in the conventional gripping head, the flange portion 100A has to be formed and the fluid path 102 has to be formed in the flange portion 100A. So, even when it is attempted to grip and rotate the lipsticks 201 to put them into their cases by the gripping heads as shown in FIG. 4, the rotation is not possible because it is blocked by the joint 106 fixed to the fluid path 102 (see FIG. 5).

SUMMARY OF THE INVENTION

Accordingly, it is an object of the present invention to provide a gripping head for use with objects such as lipsticks or the like, by which objects placed in a line with narrow spacings can be gripped all at once by a plurality of the gripping heads disposed side by side and the objects thus caught can be rotated when necessary.

The above objects can be accomplished by providing a gripping head comprising, according to the present invention, a hard body, a fluid inlet formed on top of the hard body and a fluid path formed in the body, an outer cylinder so fixed on the body as to contain the latter and open at the lower end thereof, and a tube fixed to the lower outer end of the outer cylinder and the hard body or to the upper and lower outer ends of the hard body and open at both ends thereof, the tube being inflated inwardly, and gripping an object, when a fluid such as air is supplied into the space between the tube and outer cylinder an into the space inside the tube through the fluid path from the fluid inlet.

According to the present invention, if the inside diameter P of the tube of the conventional gripping head (FIG. 1) is similar to that of the tube of a gripping head of the invention and the outside diameter Q not including the flange portion 100A of the conventional gripping head is the same as that of the outer cylinder, cylinder of a gripping head of the invention, the interwork spacing can be reduced by a space which the flange portion 100A, which is not provided in the present invention, would occupy in the conventional gripping head. Also, since the fluid inlet is formed on top of the hard body, the catching head can be freely rotated.

Further, according to the present invention, the flange portion of the conventional gripping head is dispensed with and so even in case a plurality of such gripping heads according to the present invention are disposed side by side in a line for gripping objects all at once, the interwork spacing can be made narrower than in the conventional gripping head. Also, since the fluid inlet can be formed on top of the head body, the gripping head can be rotated. Moreover, since the tube is protected by the outer cylinder, the tube will not easily be broken.

These and other objects and advantages of the present invention will be better understood from the ensuing description made, by way of example, of the embodiments of the present invention with reference to the drawings.

DETAIL DESCRIPTION OF THE PREFERRED EMBODIMENTS

Figure 1:
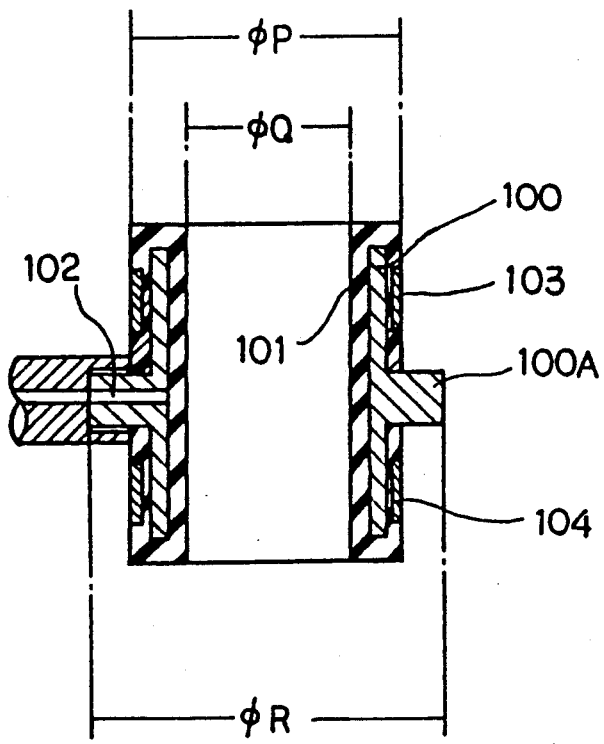
FIG. 1 is a sectional view showing a typical conventional gripping head.
Figure 2:
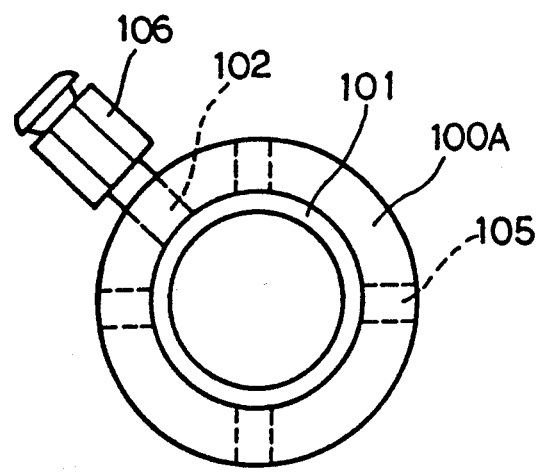
FIG. 2 is a plan view of the conventional gripping head in FIG. 1.
Figure 3:
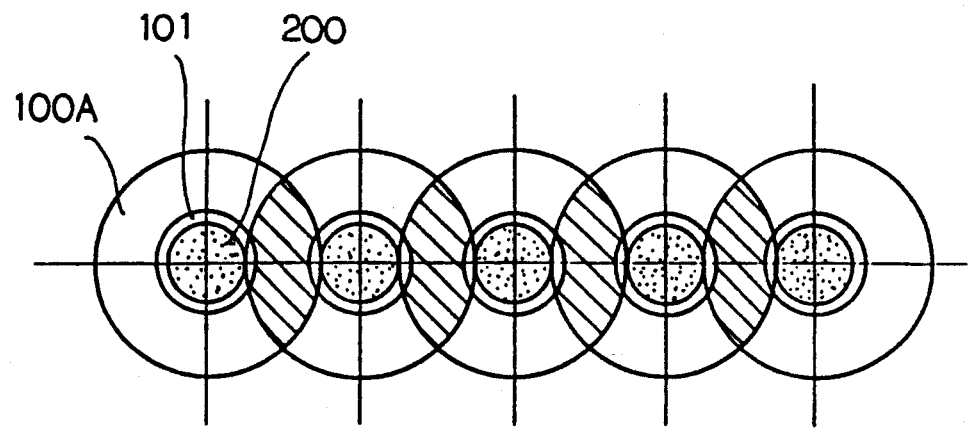
FIG. 3 is a plan view for explanation of the inconvenience in gripping objects shown in FIG. 18 by a plurality of the conventional gripping heads.
Figure 4:
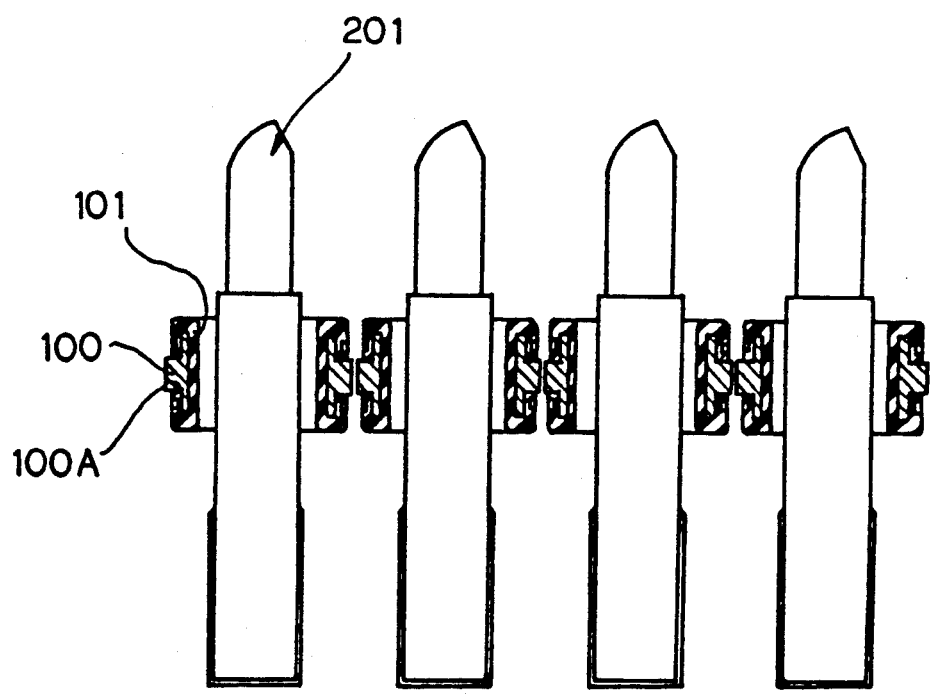
FIG. 4 is a sectional view showing the gripping of lipsticks by the conventional gripping heads.
Figure 5:
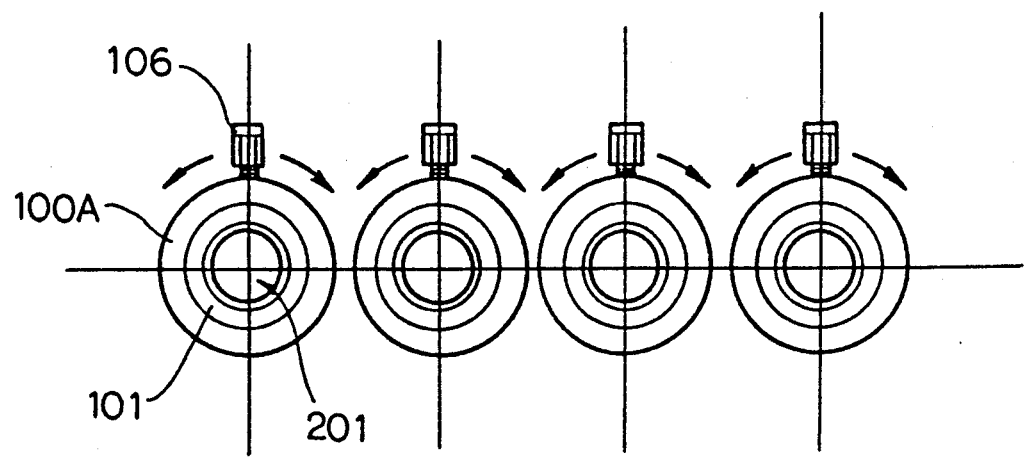
FIG. 5 is a plan view explaining the inconvenience in rotating the objects, shown in FIG. 4, which are gripped by the conventional gripping heads.
Figure 6:
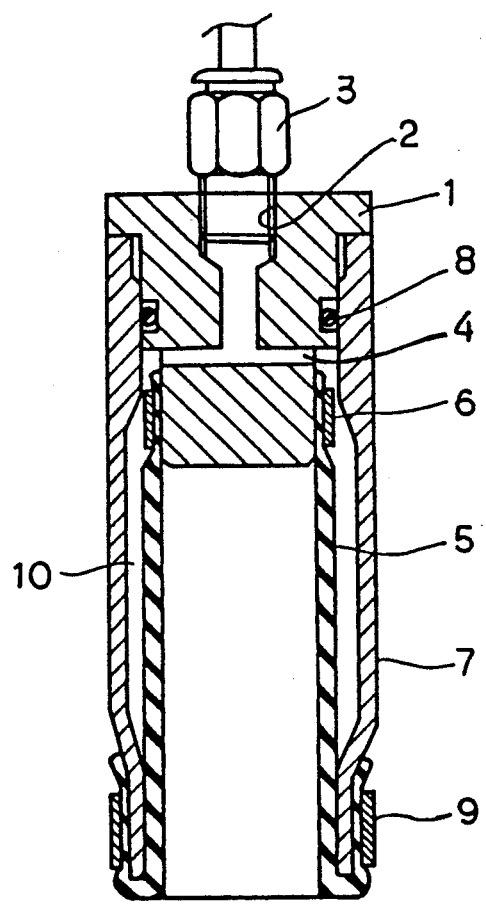
FIG. 6 is a sectional view showing a first embodiment of the present invention, into which a fluid is not yet supplied.

Referring now to FIG. 6 and subsequent drawings, the preferred embodiments of the present invention will be described herebelow.

Figure 7:
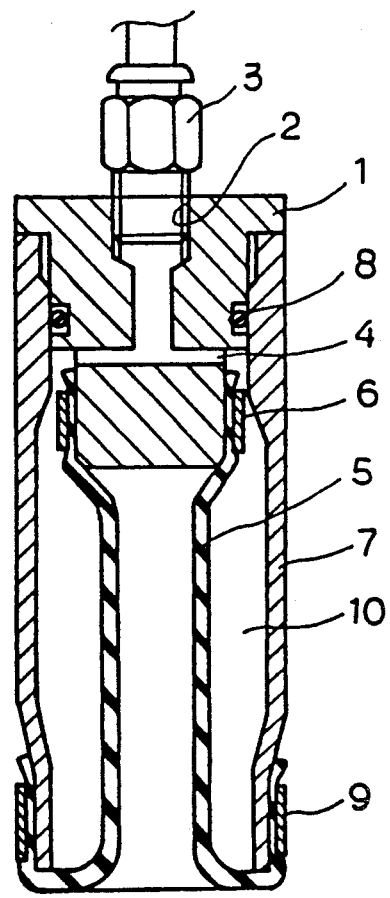
FIG. 7 is a sectional view of the first embodiment in FIG. 6, into which the fluid has been supplied.

As shown in FIG. 6, the gripping head according to the present invention comprises a hard body 1, a fluid inlet 2 formed in a top center of the hard body 1 and to which there is fixed a joint 3 which is connected to an air compressor (not shown) by means of hose or the like, and a fluid path 4 formed in the hard body 1 and communicating with the fluid inlet 2. The outside diameter of a lower end of the hard body 1 is designed small and a tube 5 is secured at an upper end thereof to the lower end of the hard body 1 with a calking ring 6. An outer cylinder 7 open at the lower end thereof is so fixed to the upper portion of the hard body 1 as to contain the latter. An O-ring 8 for sealing is interposed at the location where the outer cylinder 7 is secured to the hard body 1. The lower end of the tube 5 is turned back outwardly from the lower end of the outer cylinder 7, and this tube end is fastened by a calking ring 9. There is defined between the tube 5 and outer cylinder 7 a space 10 with which the fluid path 4 communicates and into which a fluid such as air is supplied. FIG. 7 shows the space 10 supplied with the fluid through the fluid path 4 from the fluid inlet 2. When fluid is supplied into the space 10, the tube 5 is inflated inwardly to grip an object by the inflated surface thereof.

Figure 8:
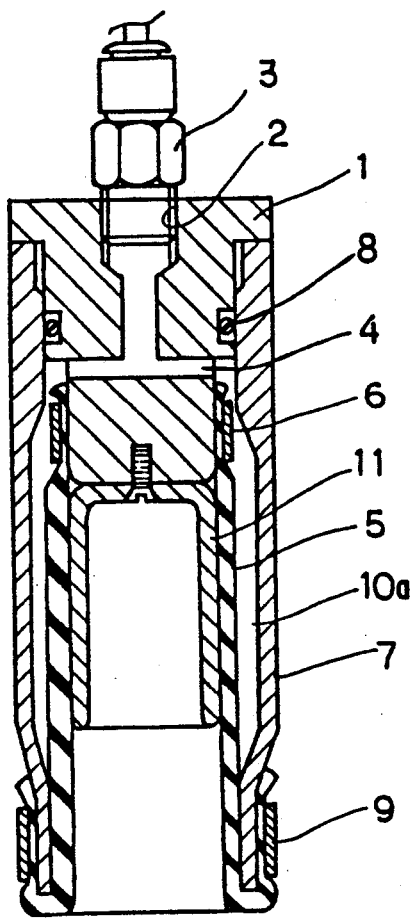
FIG. 8 is a sectional view showing a second embodiment of the present invention, in which the fluid not yet supplied.
Figure 9:
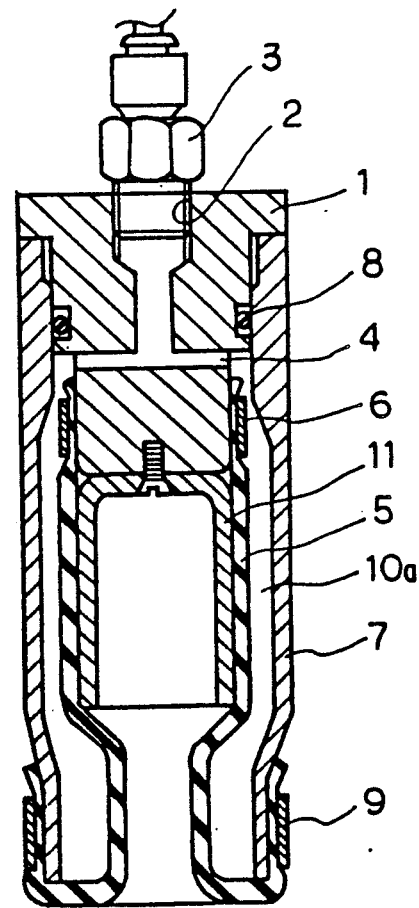
FIG. 9 is a sectional view of the second embodiment in FIG. 8, into which the fluid has been supplied.

According to the second embodiment shown in FIGS. 8 and 9, an inner pipe 11, of which the outside diameter is small, is connected to the lower end of the hard body. The rest of the structure of the gripping head of the second embodiment is like that of the first embodiment, and so will not be described any further. The inner pipe 11 is provided to prevent the tube 5 from being in contact with the lipstick body when the gripping head catches a lipstick 201. FIG. 9 shows the inward inflation of the tube 5 when the fluid is supplied into the space 10a through the fluid path 4. Because of the inner pipe 11, an object or the part of an objects inserted into the inner pipe 11 will not contact the tube 5.

Figure 10:
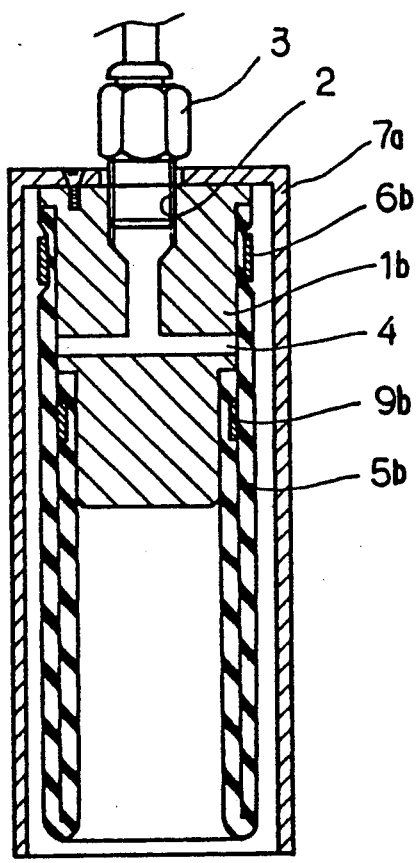
FIG. 10 is a sectional view showing a third embodiment of the present invention, into which the fluid is not yet supplied.
Figure 11:
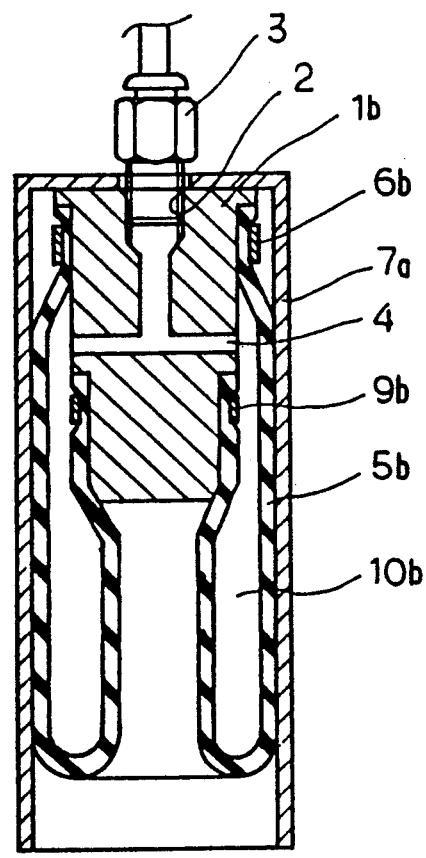
FIG. 11 is a sectional view of the third embodiment in FIG. 10, in which the fluid has been supplied.

FIGS. 10 and 11 show the third embodiment of the present invention. According to this embodiment, the upper and bottom ends of the tube 5b are secured to the upper and lower outer ends, respectively, of the hard body 1b, the tube 5b being fixed at one end thereof to the lower outer portion of the hard body 1b with the calking ring 9b, while the tube 5b thus suspended is turned back and fixed at the other end thereof to the upper outer portion of the hard body 1b with a calking ring 6b. In this embodiment, the space 10b is defined inside this turned-back tube 5b. Also, in this embodiment the outer cylinder 7a is of somewhat different configuration from that of the first and second embodiments.

Figure 12:
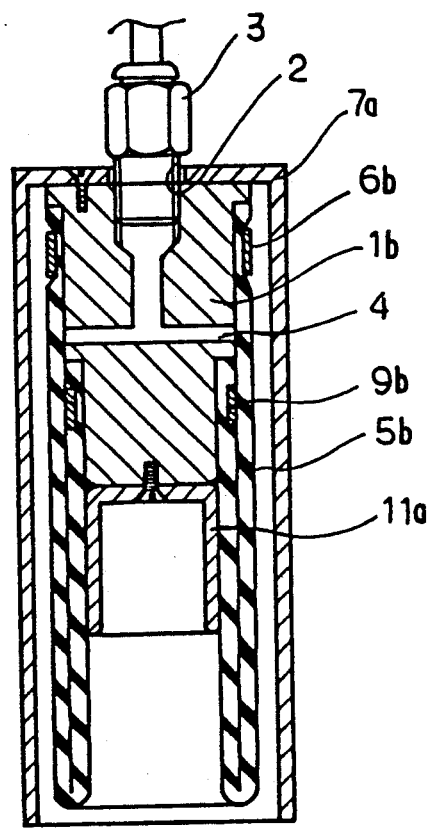
FIG. 12 is a sectional view showing a fourth embodiment of the present invention, in which the fluid is not yet supplied.
Figure 13:
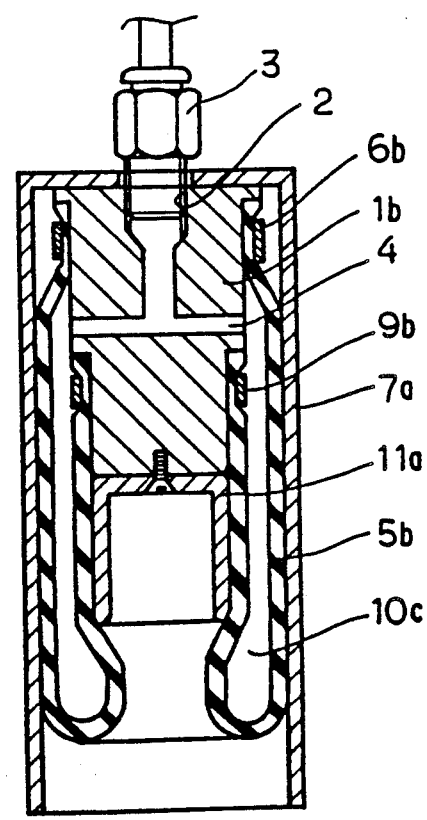
FIG. 13 is a sectional view of the fourth embodiment in FIG. 12, in which the fluid has been supplied.

FIGS. 12 and 13 show the fourth embodiment of the present invention, in which an inner pipe 11a as in the second embodiment is secured to the lower portion of the hard body 1a as in the third embodiment and a space 10c is defined inside the turned-back tube 5b; Since the rest of the structure of the gripping head according to the fourth embodiment is like that of the third embodiment, it will not be described any further.

Figure 14:
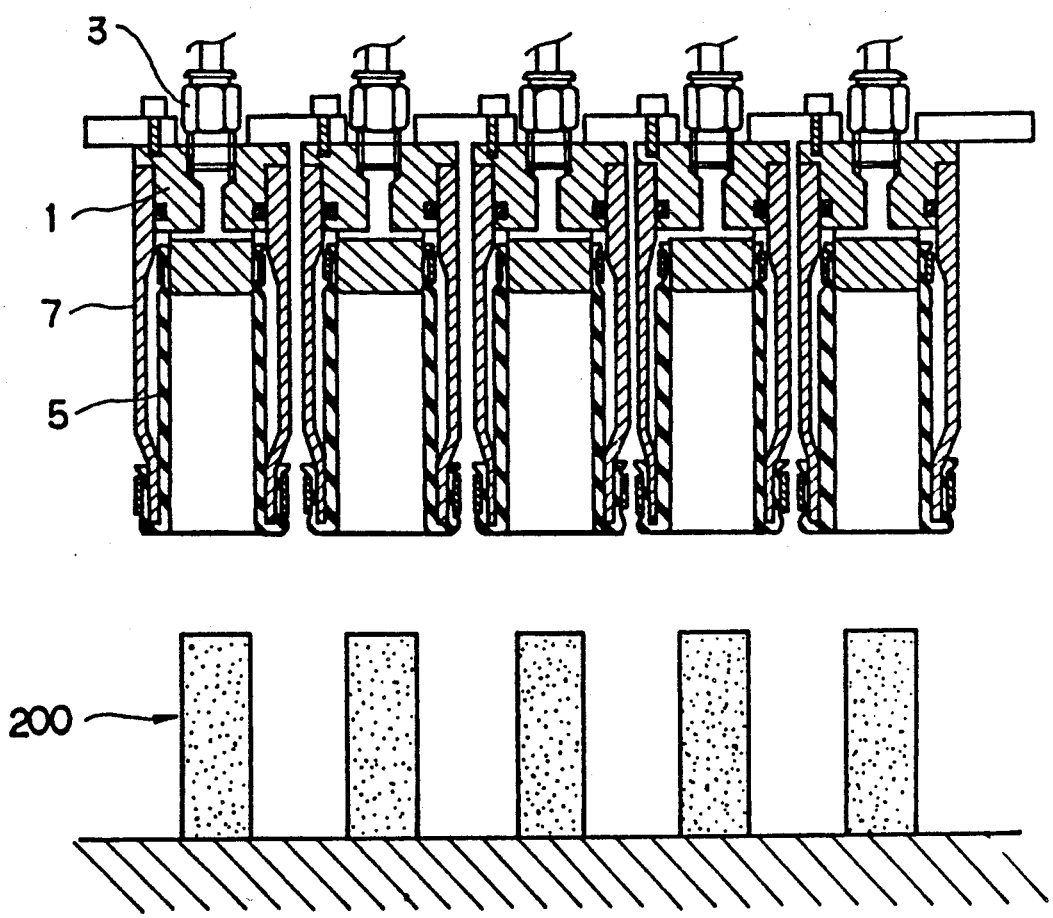
FIG. 14 is a sectional view showing the gripping a plurality of objects by a corresponding plurality of the gripping heads according to the first embodiment.

In an embodiment shown in FIG. 14, five of the gripping heads according the first embodiment are so arranged side by side in a line as to grip all at once the objects 200 placed with closer spacings than when they would be gripped by the conventional gripping head.

Figure 15:
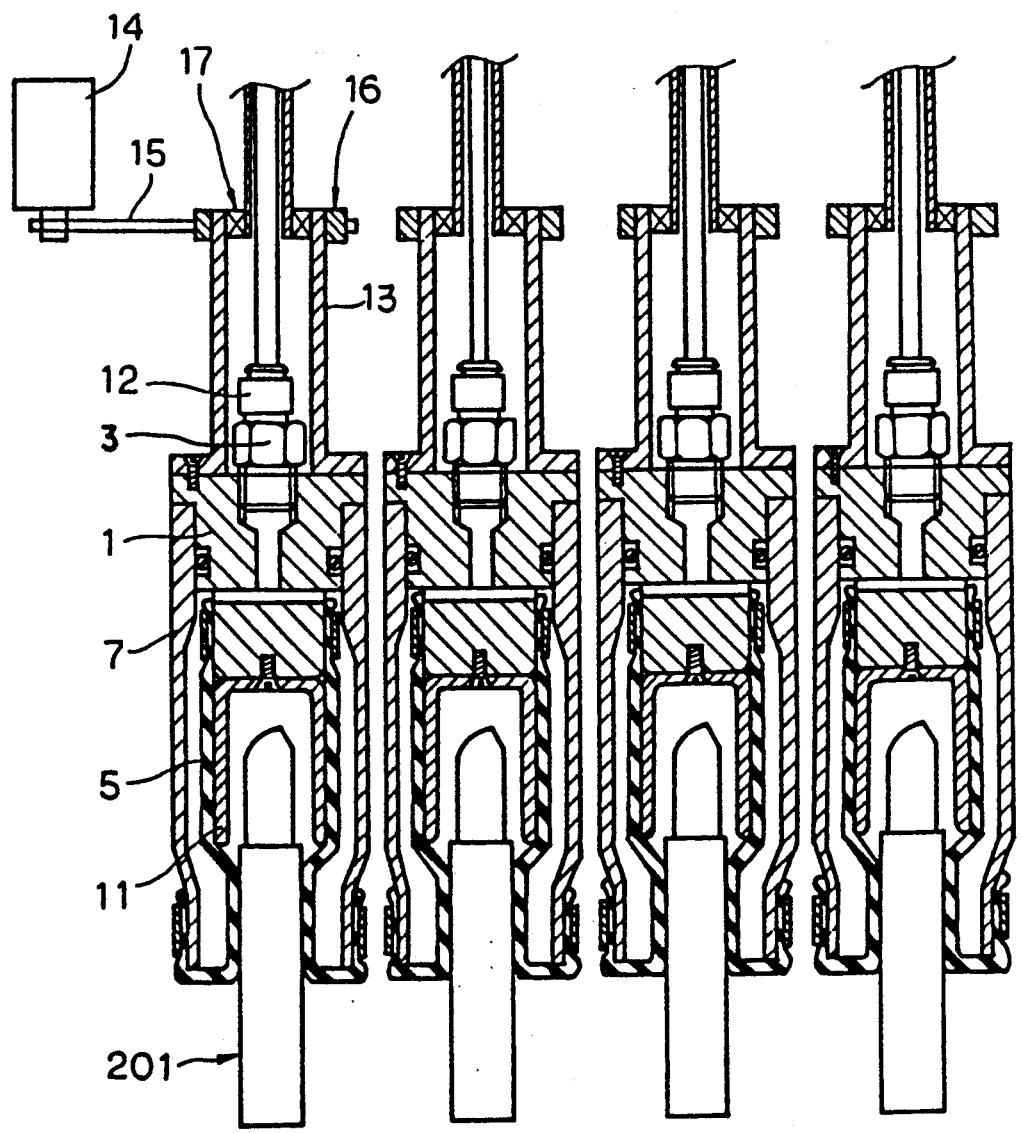
FIG. 15 is a sectional view showing an example of the second embodiment in which the gripping heads are so arranged as to be rotatable.

According to another embodiment shown in FIG. 15, the gripping head is so constructed as to be rotatable. A rotary joint 12 is provided at the joint 3, and a rotatable cylinder 13 is provided on top of the hard body 1. The rotation of a motor 14 is transmitted to the top end of this rotatable cylinder 13 by means of a belt or chain 15. The referance numeral 16 indicates a V-grooved wheel or sprocket, and 17 indicates a bearing. As seen in FIG. 15, when the entire gripping head is rotated with the rotation from the motor 14 while the lipstick 201 is fixed at the base end thereof and gripped at the case thereof by the inflated surface of the tube 5, the lipstick body in the inner pipe 11 can be put into the case.

Figure 16:
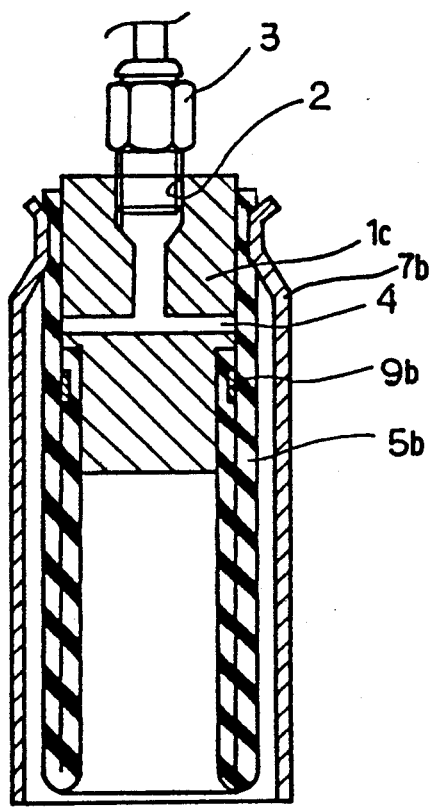
FIG. 16 is a sectional view of a fifth embodiment of the present invention, into which the fluid is not yet supplied.
Figure 17:
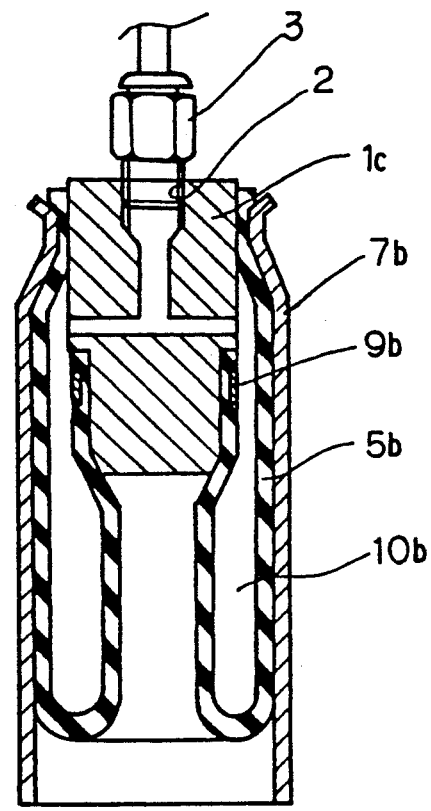
FIG. 17 is a sectional view of the fifth embodiment in FIG. 16, into which the fluid has been supplied.
Figure 18:
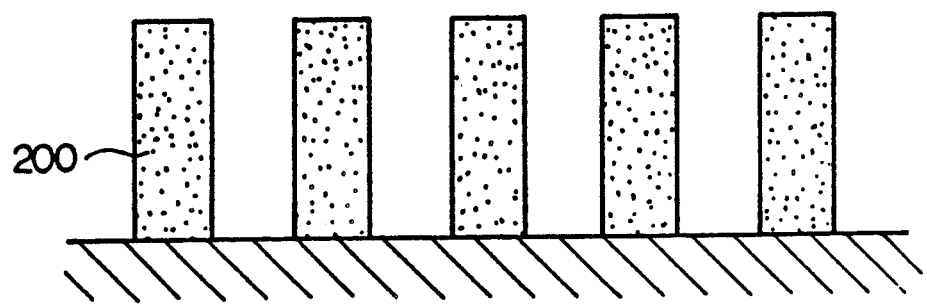
FIG. 18 is a front view showing the lipsticks closely spaced.

According to the fifth embodiment shown in FIG. 16, the upper end of the outer cylinder to secure the tube 5b to the hard body 1c. 7b functions like a calking ring. FIG. 17 shows the tube 5b supplied with the fluid in the inside space 10b thereof.

What is claimed is:

1. A gripping head of an apparatus for handling objects such as lipsticks and the like, comprising:

a hard body having a lower end, the lower end having an outer surface;

a fluid inlet formed on a top face of the hard body and a fluid path formed in the body in communication with the fluid inlet;

an outer cylinder so fixed on the body as to contain the latter, having a lower end and being open at the lower end, the lower end having an outer surface;

first and second calking rings, the calking rings being unthreaded;

a tube fixed to the outer surface of the lower end of the outer cylinder solely by means of the first calking ring and fixed to the outer surface of the lower end of the hard body solely by means of the second calking ring, the first and the second calking rings each being of hollow cylindrical form and of substantially rectangular axial cross section and each having an outer surface free of contact with any other surface, the first calking ring having an inner surface in contact only with a first cylindrical surface portion of the tube, a first cylindrical segment of the tube including the first cylindrical surface portion being sandwiched between the inner surface of the first calking ring and the outer surface of the lower end of the outer cylinder, the second calking ring having an inner surface in contact only with a second cylindrical surface portion of the tube, a second cylindrical segment of the tube including the second cylindrical surface portion being sandwiched between the inner surface of the second calking ring and the outer surface of the lower end of the hard body, the tube being fully open at both ends thereof being fixed to the hard body; and a space defined between the tube and the outer cylinder, the space communicating with the fluid path and otherwise being closed;

whereby the tube inflates inwardly and grips an object when a fluid such as air is supplied into the space through the fluid path from the fluid inlet.

* * * * *